(12) United States Patent
Tappura et al.

(10) Patent No.: US 11,402,272 B2
(45) Date of Patent: Aug. 2, 2022

(54) ABSORBER STRUCTURE FOR THERMAL DETECTORS

(71) Applicant: Teknologian tutkimuskeskus VTT Oy, Espoo (FI)

(72) Inventors: Kirsi Tappura, Tampere (FI); Aapo Varpula, VTT (FI); Mika Prunnila, VTT (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 0 days.

(21) Appl. No.: 17/290,046

(22) PCT Filed: Oct. 30, 2019

(86) PCT No.: PCT/FI2019/050776
§ 371 (c)(1),
(2) Date: Apr. 29, 2021

(87) PCT Pub. No.: WO2020/094916
PCT Pub. Date: May 14, 2020

(65) Prior Publication Data
US 2021/0404880 A1  Dec. 30, 2021

(30) Foreign Application Priority Data

Nov. 7, 2018  (FI) ..................................... 20185945

(51) Int. Cl.
*G01J 5/20* (2006.01)
*G01J 5/08* (2022.01)

(52) U.S. Cl.
CPC ............... *G01J 5/20* (2013.01); *G01J 5/0853* (2013.01); *G01J 5/0837* (2013.01)

(58) Field of Classification Search
CPC ........... G01J 5/20; G01J 5/0853; G01J 5/0837
See application file for complete search history.

(56) References Cited

U.S. PATENT DOCUMENTS 5,583,058 A    12/1996  Utsumi et al.
5,912,464 A *   6/1999  Vilain ....................... G01J 5/20
                                            250/338.4
(Continued)

FOREIGN PATENT DOCUMENTS

CA   2538436 A1 *  9/2006  ................ G01J 5/20
EP   3315929 A1    5/2018
(Continued)

OTHER PUBLICATIONS

Liu et al, "Taming the Blackbody with Metamaterials" Physical Review Letters 107, pp. 1-5, DOI: 10.1103/PhysRevLett.107. 045901, Published May 13, 2011, 6 pages.
(Continued)

*Primary Examiner* — Christine S. Kim
(74) *Attorney, Agent, or Firm* — Ziegler IP Law Group, LLC (57) ABSTRACT

An absorber structure for a thermal detector, the absorber structure including edges defining a basic form, a plurality of first legs of electrically conducting material joined in an electrically conductive manner to form, between the edges of the absorber structure, a grid having openings, the first legs forming at least one continuous connection between the edges of the absorber structure; and a plurality of second legs of electrically conducting material joined in an electrically conductive manner to the first legs, wherein the second
(Continued)

legs protrude from the first legs into the openings of the grid and terminate at points of termination located at a distance from adjacent first legs.

20 Claims, 7 Drawing Sheets

(56) References Cited

U.S. PATENT DOCUMENTS

| | | | |
|---|---|---|---|
| 8,546,757 B2* | 10/2013 | Hanson | G01J 5/023 |
| | | | 250/338.4 |
| 8,610,070 B2* | 12/2013 | Schimert | G01J 5/02 |
| | | | 250/338.4 |
| 9,528,881 B1 | 12/2016 | Dawson | |
| 2013/0206990 A1 | 8/2013 | Hsu et al. | |
| 2013/0234270 A1* | 9/2013 | Yama | H01L 27/14649 |
| | | | 257/431 |
| 2013/0256627 A1 | 10/2013 | Jain et al. | |
| 2014/0042324 A1* | 2/2014 | Kropelnicki | G01J 5/44 |
| | | | 250/340 |
| 2014/0264029 A1 | 9/2014 | Tomioka | |
| 2017/0221959 A1 | 8/2017 | Udrea et al. | |

FOREIGN PATENT DOCUMENTS

| | | |
|---|---|---|
| GB | 2521475 A | 6/2015 |
| WO | 2017153633 A1 | 9/2017 |

OTHER PUBLICATIONS

Baron et al, "Design of Metallic Mesh Absorbers for High Bandwidth Electromagnetic Waves" Progress in Electromagnetics Research C, vol. 8, pp. 135-147, XP055661744, DOI: 10.2528/PIERC09052204, Jan. 1, 2009, 13 pages.

Finnish Patent and Registration Office, Search Report, Application No. 20185945, dated May 22, 2019, 2 pages.

Huang et al, "A second-order cross fractal meta-material structure used in low-frequency microwave absorbing materials" Applied Physic A, Materials Science & Processing, DOI: 10.1007/s00339-014-8374-7, Published Mar. 6, 2014, Springer-Verlag Berlin Heidelberg 2014, 9 pages.

PCT, Notification of Transmittal of the International Search Report and the Written Opinion of the International Searching Authority, or the Declaration, Application No. PCT/FI2019/050776, dated Feb. 5, 2020, 15 pages.

Takagawa et al, "Detection Wavelength Control of Uncooled Infrared Sensors Using Two-Dimensional Lattice Plasmonic Absorbers" Sensors 2015, 15, pp. 13660-13669, DOI: 10.3390/s150613660, ISSN 1424-8220, www.mdpi.com/journal/sensors, Published Jun. 10, 2015, 10 pages.

* cited by examiner

ABSORBER STRUCTURE FOR THERMAL DETECTORS

TECHNICAL FIELD

The present application generally relates to absorber structures suited for thermal detectors.

BACKGROUND

This section illustrates useful background information without admission of any technique described herein being representative of the state of the art.

A thermal bolometer type detector comprises an absorbing nano/microbridge or membrane suspended above a reflective element. Metamaterial absorbers can be applied to provide wavelength selection in the detector. However, use of metamaterial absorbers typically tends to increase the thermal mass and limit the possibilities to design low-heat-capacity absorbers, and thus, tend to limit the speed of the detector.

For fast operation, all the sensing elements of a bolometer should have low heat capacity and high thermal conductivity, while good responsivity to the thermal power requires low thermal conductivity to the heat path and a highly absorbing membrane. However, the existing solutions do not allow for significantly reducing the thermal mass (heat capacity) due to the required supporting, temperature transducer (thermometer) and/or the additional absorber (e.g. metal-insulator-metal, MIM) structures. Further, ultra-broadband and ultra-narrowband absorption, as well as tunable band absorption, are difficult and/or expensive to attain with conventional means.

Now a new absorber structure is provided.

SUMMARY

Various aspects of examples of the disclosed embodiments are set out in the claims.

According to a first example aspect of the present disclosure, there is provided an absorber structure for a thermal detector, the absorber structure comprising:
edges defining a basic form, and
a plurality of first legs of electrically conducting material joined in an electrically conductive manner to form, between the edges of the absorber structure, a grid having openings, the first legs forming at least one continuous connection between the edges of the absorber structure. The absorber structure further comprises
a plurality of second legs of electrically conducting material joined in an electrically conductive manner to the first legs, wherein the second legs protrude from the first legs into the openings of the grid and terminate at points of termination located at a distance from adjacent first legs.

In an embodiment, electrical connectivity characteristics change at said points of termination.

In an embodiment, the points of termination comprise free space.

In an embodiment, the second legs connect at the points of termination to a second piece of material that has different electrical connectivity characteristics compared to the second legs.

In an embodiment, the second piece of material is made of different material from the material of the second leg and/or has different geometry from geometry of the second legs.

In an embodiment, the different geometry is provided with wire of electrically conducting material having a smaller cross section than the second legs.

In an embodiment, the different material is dielectric, semiconducting or poorly conducting material.

In an embodiment, the second piece of material connects a second leg to another first leg or to another second leg.

In an embodiment, the electrically conductive material comprises metal, semimetal or highly doped semiconductor material.

In an embodiment, the electrically conductive material comprises at least one of titanium Ti, titanium nitride TiN, titanium tungsten TiW, tungsten W, and aluminum doped zinc oxide Al:ZnO.

In an embodiment, the second legs form a periodical pattern.

In an embodiment, the absorber structure further comprises third legs of electrically conducting material joined in an electrically conductive manner to the second legs.

In an embodiment, the second legs further comprise a direct, electrically conducting connection to other second legs.

According to a second example aspect of the present disclosure, there is provided a thermal detector comprising an absorber structure of the first aspect or any associated embodiment.

In an embodiment, the thermal detector comprises thermoelectric legs and the absorber structure forms contacts between the thermoelectric legs.

In an embodiment, the thermal detector comprises a reflective element in a stacked configuration with the absorber structure and a cavity formed between the absorber structure and the reflective element.

In an embodiment, depth of the cavity formed between the absorber structure and the reflective element is different from $\lambda/4$ of a target absorption wavelength.

In an embodiment, the absorber structure serves as a support structure of the thermal detector.

Different non-binding example aspects and embodiments of the present disclosure have been illustrated in the foregoing. The embodiments in the foregoing are used merely to explain selected aspects or steps that may be utilized in implementations of the present disclosure. Some embodiments may be presented only with reference to certain example aspects of the disclosed embodiments. It should be appreciated that corresponding embodiments may apply to other example aspects as well.

BRIEF DESCRIPTION OF THE DRAWINGS

For a more complete understanding of example embodiments of the present disclosure, reference is now made to the following descriptions taken in connection with the accompanying drawings in which.

DETAILED DESCRIPTION OF THE DRAWINGS

The present disclosure and its potential advantages are understood by referring to FIGS. 1 through 12 of the drawings. In this document, like reference signs denote like parts or steps.

Embodiments of the present disclosure provide absorber structures that enable high-performance (high-responsivity) low-thermal mass (high-speed) absorbers for thermal detectors. The term thermal detector generally refers to a device that monitors electromagnetic radiation through heating of an absorber element. The thermal detector may be referred to as a thermal photodetector, too. Absorber structures of example embodiments may serve also as the temperature transducer (e.g. thermometer, thermopile, etc.) and/or as electrical contacts (or as a part of them) of thermal detectors. Absorber structures of example embodiments enable providing thermal detectors without requiring metal-insulator-metal structures. Instead vacuum, gas, gas mixture or air cavities can be used. Various metamaterial type absorbers according to different embodiments can be designed for the different spectral ranges and bandwidths.

Various examples of absorber structures according to example embodiments are discussed in the following. The absorber structures may be made of metals, semimetals or highly doped semiconductor materials forming a single structured mesh. Example materials that may be used include at least: titanium Ti, titanium nitride TiN, titanium tungsten TiW, tungsten W, aluminum doped zinc oxide Al:ZnO, and $SrTiO_3$. Also other conductive materials can be used. In an embodiment the structured absorber mesh is combined with highly doped silicon acting as a thermopile or with insulating supporting structures. The absorber structures of example embodiments are not limited to these materials and combinations, though.

Figure 1:
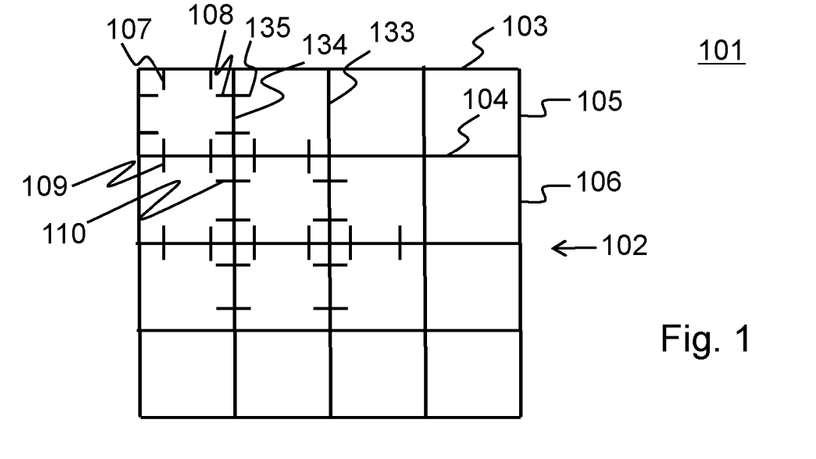
FIG. 1 illustrates an absorber structure of a first example embodiment.

FIG. 1 illustrates an absorber structure 101 of a first example embodiment. The absorber structure 101 comprises edges that define a basic form. The form may be a planar form. The form is square in this example. The absorber structure 101 comprises a plurality of first legs 103-106, 133-134 of electrically conductive material. The first legs 103-106, 133-134 are connected to other first legs 103-106, 133-134 in electrically conductive manner to form a grid 102 that has square openings defined by the first legs and connections between the first legs. The first legs may be referred to as strands of material, too. The grid 102 extends between the edges of the absorber structure 101.

The first legs 103-106, 133-134 provide continuous connections between the edges of the absorber structure thereby keeping the absorber structure together and enabling that the absorber structure can be for example suspended above a reflective element in a thermal detector.

Additionally the absorber structure 101 comprises a plurality of second legs 107-110 of electrically conducting material. The second legs 107-110 are joined in an electrically conductive manner to the first legs. The connection may be at one end of the second legs or in the middle of the second legs, for example. The second legs 107-110 protrude from the first legs into the openings of the grid 102 and terminate at points of termination located at a distance from adjacent first legs. Electrical connectivity characteristics change at said points of termination. In other words, the second legs do not directly extend to or form a contact with another first leg. For example in FIG. 1 it can be seen that the second leg 108 joined to the first leg 134 terminates at a point of termination 135 located at a distance from the adjacent first leg 133. In the example of FIG. 1 there is free or empty space at the point of termination. Alternatively the second legs may be connected to a second piece of material at the point of termination. The second piece of material exhibits electrical connectivity characteristics that are different from electrical connectivity characteristics of the second legs. The second piece of material may be made of different material and/or material with different geometry. The different material may be less conductive material, such as dielectric, semiconducting or poorly conducting material. The different geometry may be for example material with smaller cross section than cross section of the second leg. In this way the point of termination may be referred to as point of discontinuity and the second legs 107-110 provide discontinuous connections between the edges of the absorber structure 101.

In an embodiment the first and second legs form a planar structure and the second legs protrude into the openings of the grid in the same plane with the grid. The second legs may be perpendicularly positioned in relation to the first legs like in the example shown in FIG. 1 or the second legs may protrude at any chosen angle from the first legs. In an embodiment the second legs form a periodical pattern that repeats over the form defined by the edges of the absorber structure.

In an embodiment the absorber structure 101 comprises third legs (not shown in FIG. 1) of electrically conducting material joined in an electrically conductive manner to the second legs 107-110.

Figure 2:
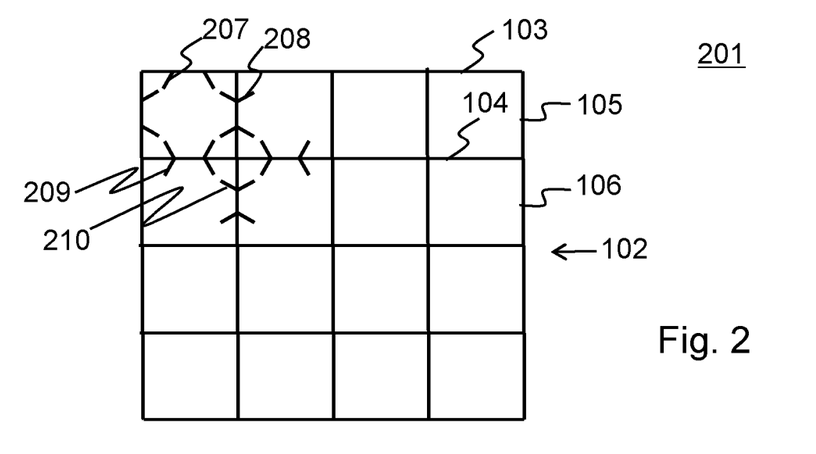
FIG. 2 illustrates an absorber structure of a second example embodiment.

FIG. 2 illustrates an absorber structure 201 of a second example embodiment. This example is similar to the example of FIG. 1 and the disclosure of FIG. 1 applies to FIG. 2, too, except that the absorber structure 201 comprises second legs 207-210 that protrude from the first legs at an angle that is different from 90 degrees.

Figure 3:
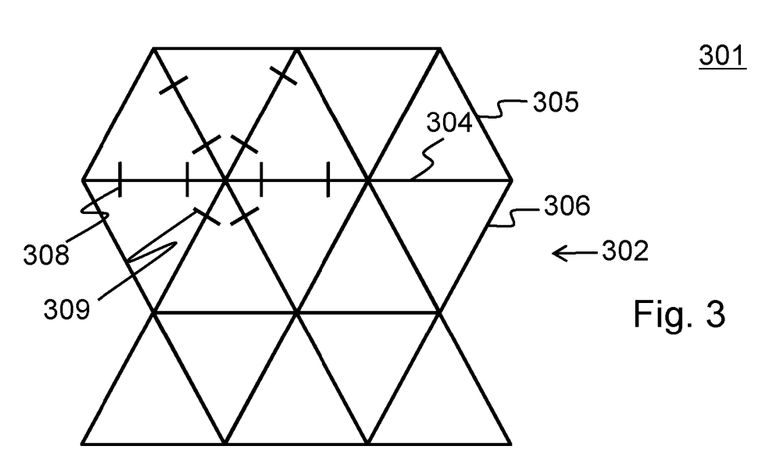
FIG. 3 illustrates an absorber structure of a third example embodiment.

FIG. 3 illustrates an absorber structure 301 of a third example embodiment. This example is similar to the example of FIG. 1 and the disclosure of FIG. 1 applies to FIG. 3, too, except that FIG. 3 shows first legs 304-306 that define a grid 302 with triangular openings. It is to be noted that also other forms may be used and the openings defined by the first legs may be for example hexagonal or octagonal. Similarly to FIGS. 1 and 2, the absorber structure 301 of FIG. 3 comprises second legs 308-309 of electrically conducting material. The second legs 308-309 are joined in an electrically conductive manner to the first legs. The connection may be at one end of the second legs or in the middle of the second legs, for example. The second legs 308-309 protrude from the first legs into the openings of the grid 302 and terminate at points of termination located at a distance from adjacent first legs.

It is to be noted that the second legs shown in FIGS. 1-3 may repeat periodically over the whole absorber structure even though this is not shown in the FIGS.

Figure 4:
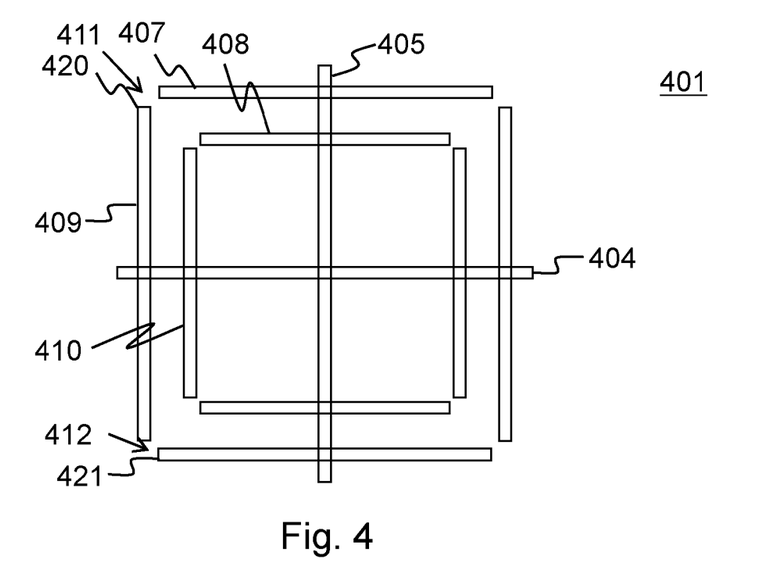
FIG. 4 illustrates an absorber structure of a fourth example embodiment.
Figure 5:
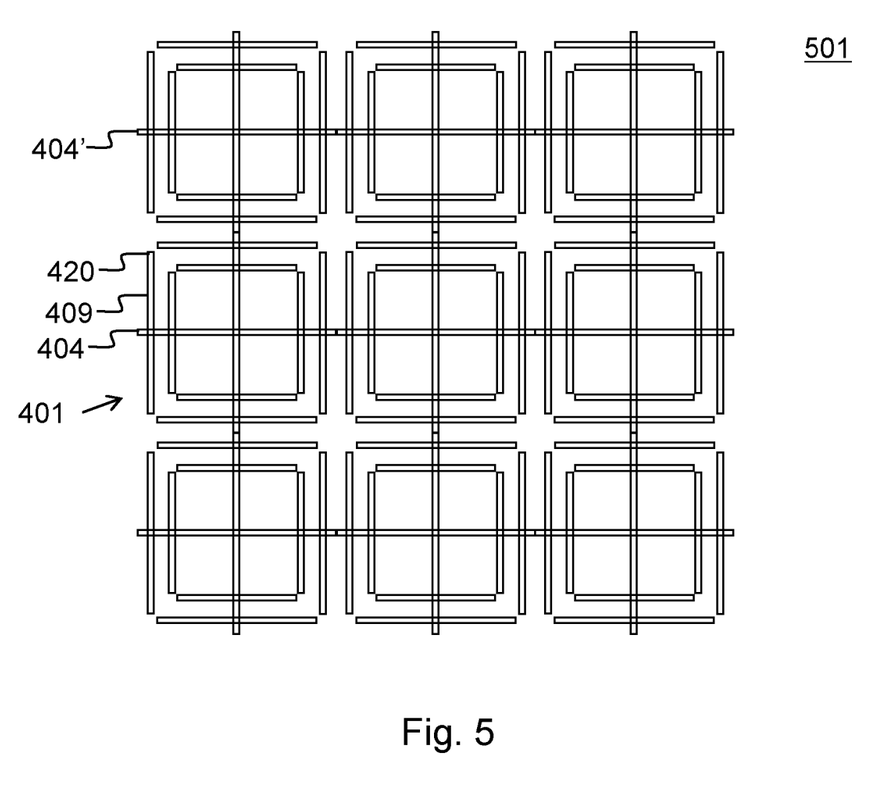
FIG. 5 shows an absorber structure formed of a plurality of absorber structures of FIG. 4.

FIG. 4 illustrates an absorber structure 401 of a fourth example embodiment. The shown absorber structure 401 is a unit cell that is typically repeated over a desired absorber area. FIG. 5 shows an absorber structure 501 formed of a plurality of adjacent absorber structures or unit cells of FIG. 4.

The absorber structure 401 comprises first legs 404-405 of electrically conducting material and second legs 407-410 of electrically conducting material. The first legs 404-405 are connected to each other in electrically conductive manner and, in FIG. 5, the first legs of plurality of adjacent unit cells form a grid that has openings defined by the first legs 404-405 and connections between the first legs. The grid that is formed extends between the edges of the absorber structure 501.

The first legs 404-405 provide continuous connections between the edges of the absorber structure thereby keeping the absorber structure together and enabling that the absorber structure can be for example suspended above a reflective element in a thermal detector.

The second legs 407-410 are joined in an electrically conductive manner to the first legs 404-405. In the shown example the connection is in the middle of the second legs. The second legs 407-410 protrude from the first legs 404-405 and the second legs terminate at points of termination 420-421 located at a distance from adjacent first legs. It is to be noted that the adjacent first leg may in fact be part of an adjacent unit cell. In such case the second legs terminate at points of termination located at a distance from the edges of the unit cell and thereby at a distance from first legs of other unit cells. Electrical connectivity characteristics change at said points of termination 420-421. In other words, the second legs do not directly extend to or form a contact with another first leg. In the example of FIG. 4 there is free or empty space 411-412 at the point of termination 420-421. In this way the second legs 407-410 provide discontinuous connections between the edges of the absorber structure 401 of FIG. 4 or the absorber structure 501 of FIG. 5.

FIG. 5 comprises the unit cell 401 of FIG. 4 on left hand side of the shown structure. It can be seen that the point of termination 420 where the second leg 409 of the unit cell 401 terminates is located at a distance from a first leg 404' of an adjacent unit cell.

Figure 6:
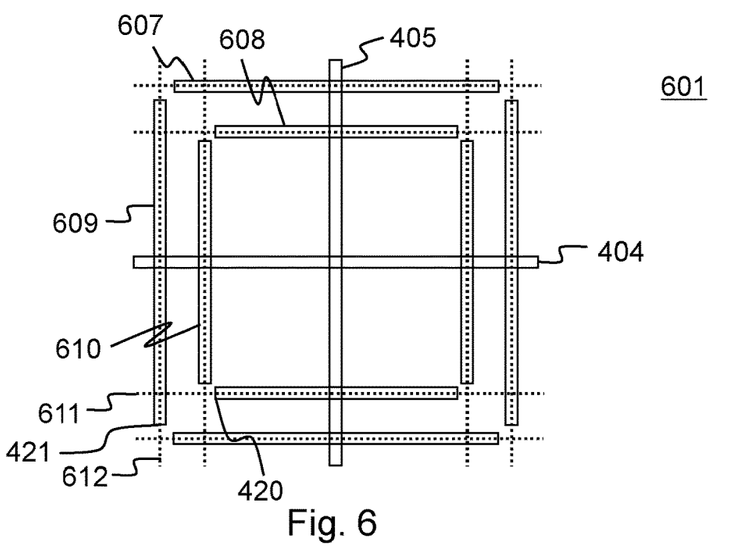
FIG. 6 illustrates an absorber structure of a fifth example embodiment.
Figure 7:
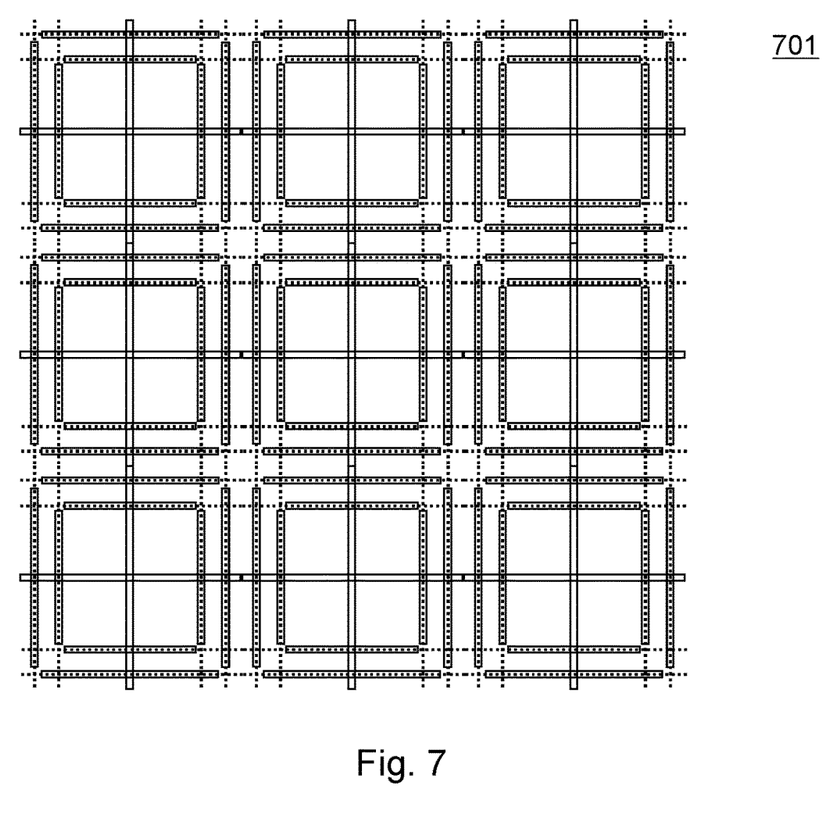
FIG. 7 shows an absorber structure formed of a plurality of absorber structures of FIG. 6.

FIG. 6 illustrates an absorber structure 601 of a fifth example embodiment. The shown absorber structure 601 is a unit cell that is typically repeated over a desired absorber area. FIG. 7 shows an absorber structure 701 formed of a plurality of adjacent absorber structures or unit cells of FIG. 6.

The absorber structure 601 comprises first legs 404-405 of electrically conducting material and second legs 607-610 of electrically conducting material. The first legs 404-405 are connected to each other in electrically conductive manner and, in FIG. 7, the first legs of plurality of adjacent unit cells form a grid that has openings defined by the first legs 404-405 and connections between the first legs. The grid that is formed extends between the edges of the absorber structure 701.

The first legs 404-405 provide continuous connections between the edges of the absorber structure thereby keeping the absorber structure together and enabling that the absorber structure can be for example suspended above a reflective element in a thermal detector.

The second legs 607-610 are joined in an electrically conductive manner to the first legs 404-405. In the shown example the connection is in the middle of the second legs. The second legs 607-610 protrude from the first legs 404-405 and the second legs terminate at points of termination 420-421 located at a distance from adjacent first legs. It is to be noted that the adjacent first leg may in fact be part of an adjacent unit cell. In such case the second legs terminate at points of termination located at a distance from the edges of the unit cell and thereby at a distance from first legs of other unit cells. Electrical connectivity characteristics change at said points of termination 420-421. In other words, the second legs do not directly extend to or form a contact with another first leg. In the example of FIG. 6 the second legs 607-610 are connected to a second piece of material 611-612 at the points of termination 420-421. The second piece of material 611-612 exhibits electrical connectivity characteristics that are different from electrical connectivity characteristics of the second legs 607-610. More specifically, there is wire 611, 612 of electrically conducting material having a smaller cross section than the second legs forming the point of discontinuity. The wires may be made of the same or different material with the second legs. In this way the second legs 607-610 provide discontinuous connections between the edges of the absorber structure 601 of FIG. 6 or the absorber structure 701 of FIG. 7. Nevertheless the wire portion may extend under or above the second legs over the full length of the second legs.

Further, the wires 611, 612 may connect a second leg to another first leg or to another second leg depending on the absorber structure.

Figure 8:
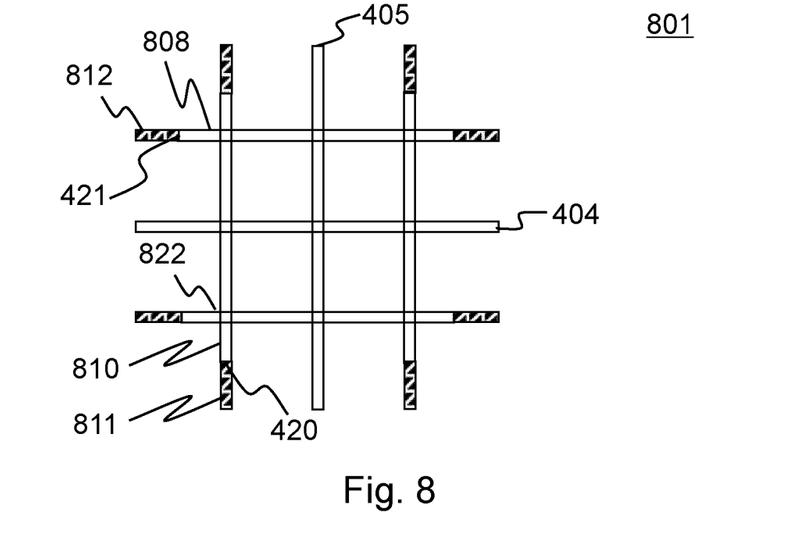
FIG. 8 illustrates an absorber structure of a sixth example embodiment.
Figure 9:
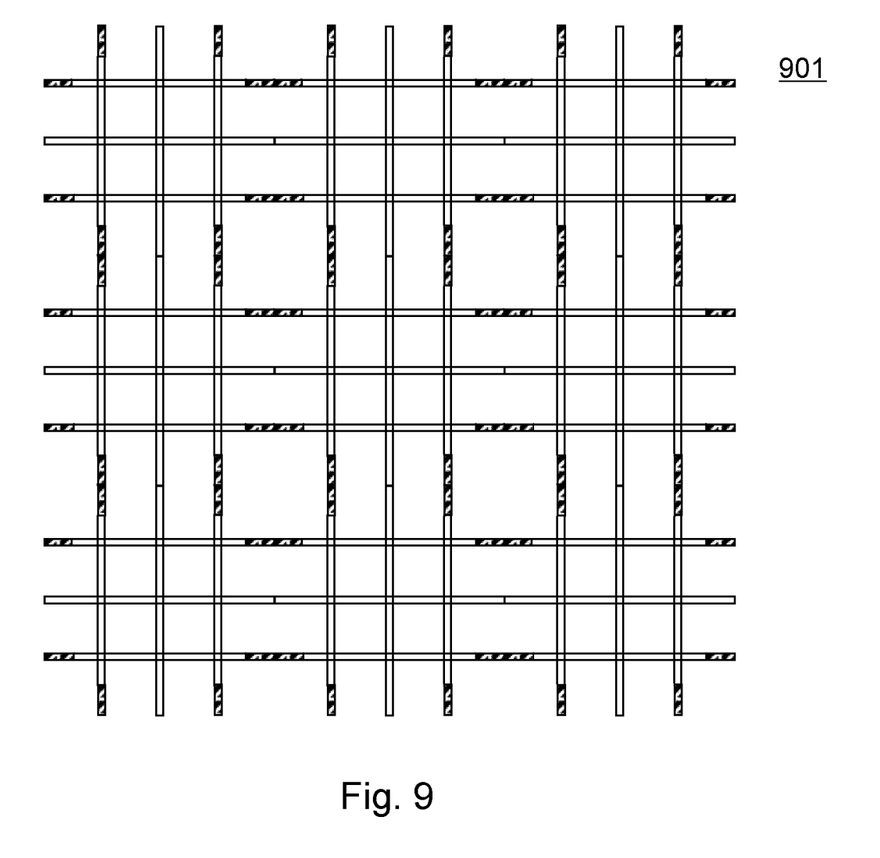
FIG. 9 shows an absorber structure formed of a plurality of absorber structures of FIG. 8.

FIG. 8 illustrates an absorber structure 801 of a sixth example embodiment. The shown absorber structure 801 is a unit cell that is typically repeated over a desired absorber area. FIG. 9 shows an absorber structure 901 formed of a plurality of adjacent absorber structures or unit cells of FIG. 8.

The absorber structure 801 comprises first legs 404-405 of electrically conducting material and second legs 808, 810 of electrically conducting material. The first legs 404-405 are connected to each other in electrically conductive manner and, in FIG. 9, the first legs of plurality of adjacent unit cells form a grid that has openings defined by the first legs 404-405 and connections between the first legs. The grid that is formed extends between the edges of the absorber structure 901.

The first legs 404-405 provide continuous connections between the edges of the absorber structure thereby keeping the absorber structure together and enabling that the absorber structure can be for example suspended above a reflective element in a thermal detector.

The second legs 808, 810 are joined in an electrically conductive manner to the first legs 404-405. In the shown example the connection is in the middle of the second legs. The second legs 808, 810 protrude from the first legs 404-405 and the second legs terminate at points of termination 420-421 located at a distance from adjacent first legs. It is to be noted that the adjacent first leg may in fact be part of an adjacent unit cell. In such case the second legs terminate at points of termination located at a distance from the edges of the unit cell and thereby at a distance from first legs of other unit cells. Electrical connectivity characteristics change at said points of termination 420-421. In other words, the second legs do not directly extend to or form a contact with another first leg. In the example of FIG. 8 the second legs 808, 810 are connected to a second piece of material 811-812 at the points of termination 420-421. The second piece of material 811-812 exhibits electrical connectivity characteristics that are different from electrical connectivity characteristics of the second legs 807-810. In the example of FIG. 8 the second piece of material 811-812 is made of different material compared to the second legs 808, 810. The different material may be less conductive material, such as dielectric, semiconducting or poorly conducting material. In this way the second legs 808, 810 provide discontinuous connections between the edges of the absorber structure 801 of FIG. 8 or the absorber structure 901 of FIG. 9.

Further, the second piece of material 811, 812 may provide a connection to another first leg or to another second leg depending on the absorber structure. In the example embodiment of FIG. 8 the second legs 808 are additionally connected to other second legs 810 in an electrically conducting manner, see point 822.

Figure 10A:
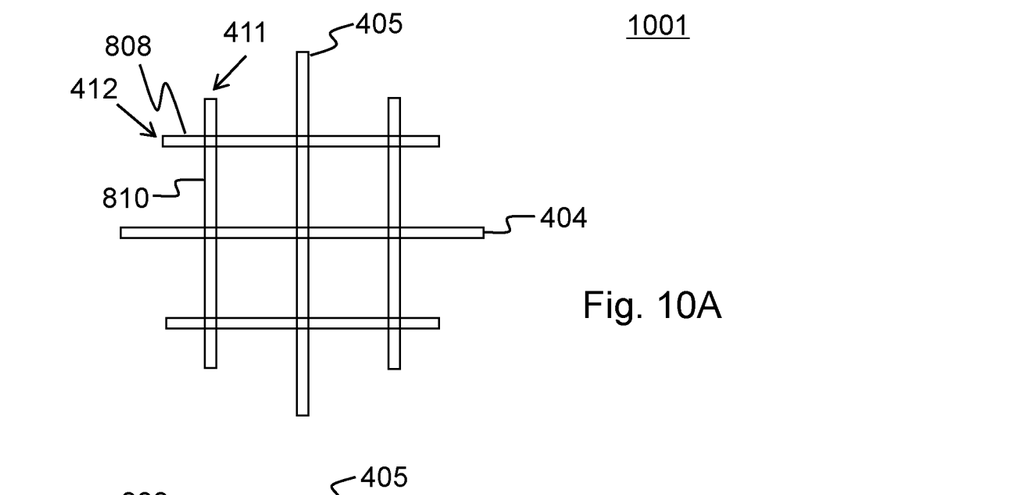
FIGS. 10A-10C illustrate absorber structures of further example embodiments.
Figure 10B:
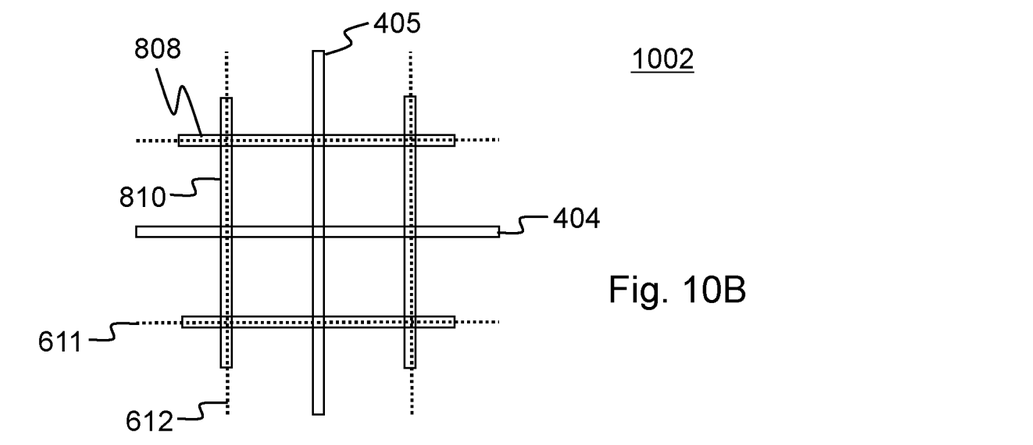
Figure 10C:
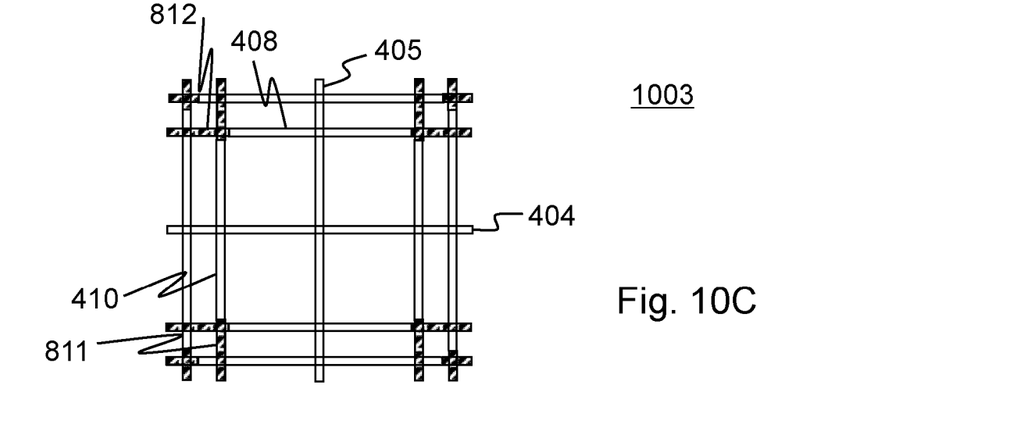

FIGS. 10A-10C illustrate absorber structures 1001, 1002, and 1003 of further example embodiments.

The absorber structure 1001 of FIG. 10A comprises first legs 404-405 of electrically conducting material and second legs 808, 810 of electrically conducting material. The structure 1001 is similar to the structure 801 of FIG. 8 except that there is free or empty space 411, 412 instead of the second piece of material shown in FIG. 8.

The absorber structure 1002 of FIG. 10B comprises first legs 404-405 of electrically conducting material and second legs 808, 810 of electrically conducting material. The structure 1002 is similar to the structure 801 of FIG. 8 except that there are wires 611, 612 of electrically conducting material having a smaller cross section than the second legs instead of the different material 811, 812 shown in FIG. 8. The wires 611, 612 may be made of the same material with the second legs or different material may be used.

The absorber structure 1003 of FIG. 100 comprises first legs 404-405 of electrically conducting material and second legs 408, 410 of electrically conducting material. The structure 1003 is similar to the structure 401 of FIG. 4 except that there is piece of different material 811, 812 instead of the free or empty space 411, 412 shown in FIG. 4.

Figure 11A:
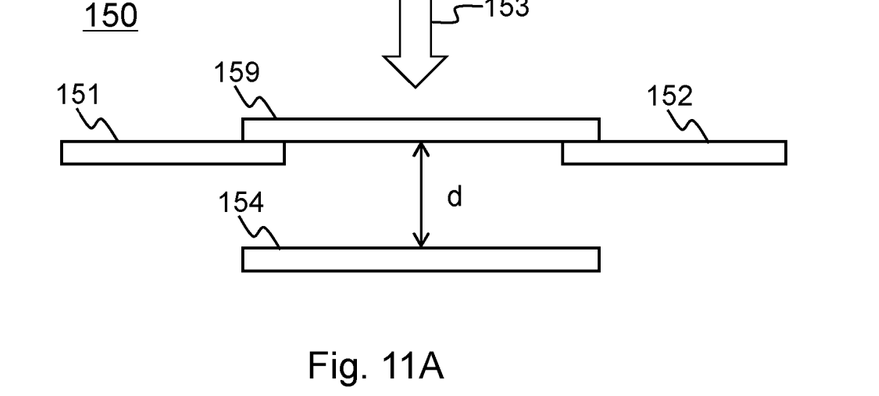
FIGS. 11A-11C show cross sectional views of thermal detectors according to certain embodiments.
Figure 11B:
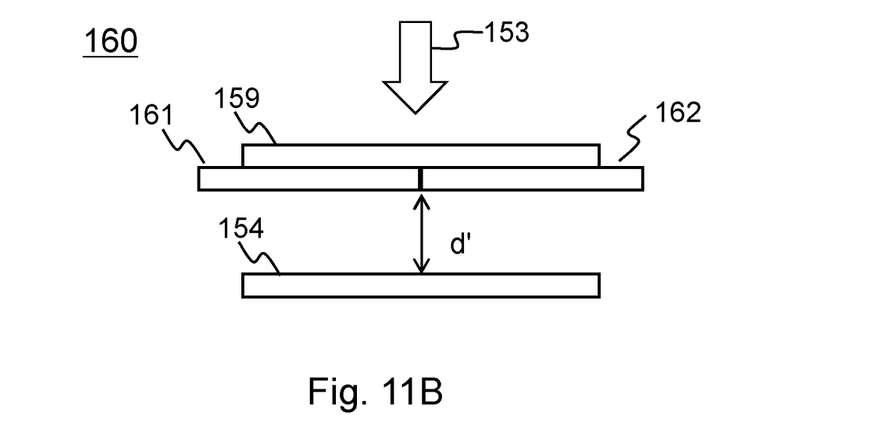
Figure 11C:
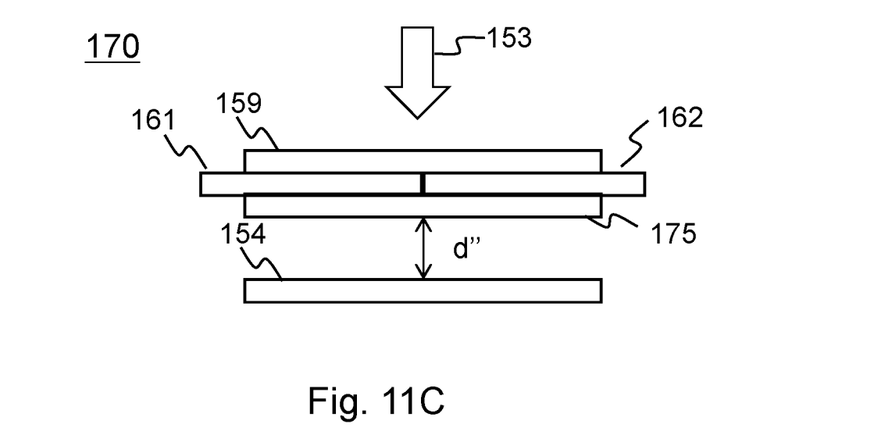

FIGS. 11A-11C shows cross sectional side views of thermal detectors 150, 160, 170 according to certain embodiment.

The thermal detector 150 of FIG. 11A comprises a patterned absorber structure 159, a reflective element 154, electrodes 151 and 152 made of electrically active material.

The patterned absorber structure 159 may comprise for example one of the absorber structures shown in FIGS. 1-9 and 10A-10C. In an embodiment the absorber structure 159 may be made of metals, semimetals or highly doped semiconductor materials forming a single structured mesh. Example materials that may be used include at least: titanium Ti, titanium nitride TiN, titanium tungsten TiW, tungsten W, aluminum doped zinc oxide Al:ZnO and SrTiO$_3$. Also other conductive materials can be used. In an embodiment the electrode 151 is made of N-type thermoelectric material, such as highly doped N-type silicon Si, polysilicon or other semiconductor, and the electrode 152 is made of P-type thermoelectric material, such as highly doped P-type silicon Si, polysilicon or other semiconductor. Also other thermoelectric materials can be used in electrodes 151 and 152, such as Bi$_2$Te$_3$ and Bi$_2$Se$_3$. The reflective element 154 comprises for example metals and/or dielectrics for distributed Bragg mirror or the reflective element may be made of highly doped semiconductor material such as N++ doped silicon.

The absorber structure 159 is suspended between and connected to the electrodes 151 and 152. The absorber structure 159 and the reflective element 154 are in a stacked configuration and a cavity of depth d is formed between the absorber structure 159 and the reflective element 154. There may be vacuum in the cavity or the cavity may be filled with suitable gas, gas mixture or air. The depth d may be chosen to suit desired wavelength. In an embodiment the depth d is different from $\lambda/4$ of a target absorption wavelength. In yet another embodiment the depth d is less than $\lambda/4$ of a target absorption wavelength. In yet another embodiment the depth d is $\lambda/4$ of a target absorption wavelength.

The absorber structure 159 absorbs radiation illustrated by an arrow 153 and causes electrical changes in the electrodes 151 and 152.

The thermal detector 160 of FIG. 11B comprises a patterned absorber structure 159, a reflective element 154, electrodes 161 and 162 made of electrically active material.

The patterned absorber structure 159 may comprise for example one of the absorber structures shown in FIGS. 1-9 and 10A-10C. In an embodiment the absorber structure 159 may be made of metals, semimetals or highly doped semiconductor materials forming a single structured mesh. Example materials that may be used include at least: titanium Ti, titanium nitride TiN, titanium tungsten TiW, tungsten W, aluminum doped zinc oxide Al:ZnO, and SrTiO$_3$. Also other conductive materials can be used. In an embodiment the electrode 161 is made of N-type thermoelectric material, such as highly doped N-type silicon Si, polysilicon or other semiconductor, and the electrode 162 is made of P-type thermoelectric material, such as highly doped P-type silicon Si, polysilicon or other semiconductor. Also other thermoelectric materials can be used in electrodes 161 and 162, such as Bi$_2$Te$_3$ and Bi$_2$Se$_3$. The reflective element 154 comprises for example metals and/or dielectrics for distributed Bragg mirror or the reflective element may be made of highly doped semiconductor material such as N++ doped silicon.

The absorber structure 159 is suspended between and connected to the electrodes 161 and 162 that extend under the absorber structure 159. The absorber structure 159, the electrodes 161, 162 and the reflective element 154 are in a stacked configuration and a cavity of depth d' is formed between the electrode layer with electrodes 161 and 162 and the reflective element 154. There may be vacuum in the cavity or the cavity may be filled with suitable gas, gas mixture or air. The depth d' may be chosen to suit desired wavelength. In an embodiment the depth d' is different from $\lambda/4$ of a target absorption wavelength. In yet another embodiment the depth d' is less than $\lambda/4$ of a target absorption wavelength. In yet another embodiment the depth d' is $\lambda/4$ of a target absorption wavelength.

The absorber structure 159 absorbs radiation illustrated by an arrow 153 and causes electrical changes in the electrodes 161 and 162.

The thermal detector 170 of FIG. 11C comprises a patterned absorber structures 159 and 175, a reflective element 154, electrodes 161 and 162 made of electrically active material.

The patterned absorber structures 159 and 175 may comprise for example one of the absorber structures shown in FIGS. 1-9 and 10A-10C. In an embodiment the absorber structure 159 may be made of metals, semimetals or highly doped semiconductor materials forming a single structured mesh. Example materials that may be used include at least: titanium Ti, titanium nitride TiN, titanium tungsten TiW, tungsten W, aluminum doped zinc oxide Al:ZnO, and SrTiO$_3$. Also other conductive materials can be used. The absorber structures 159 and 175 may be made of same or different material and they may have the same pattern or different pattern.

In an embodiment the electrode 161 is made of N-type thermoelectric material, such as highly doped N-type silicon Si, polysilicon or other semiconductor, and the electrode 162 is made of P-type thermoelectric material, such as highly doped P-type silicon Si, polysilicon or other semiconductor. Also other thermoelectric materials can be used in electrodes 161 and 162, such as $Bi_2Te_3$ and $Bi_2Se_3$. The reflective element 154 comprises for example metals and/or dielectrics for distributed Bragg mirror or the reflective element may be made of highly doped semiconductor material such as N++ doped silicon.

The absorber structure 159 is placed above the electrodes 161 and 162 that extend under the absorber structure 159 and the absorber structure 175 is placed under the electrodes 161 and 162. The absorber structure 159, the electrodes 161, 162, the absorber structure 175 and the reflective element 154 are in a stacked configuration and a cavity of depth d" is formed between the lower absorber layer with absorber structure 175 and the reflective element 154. There may be vacuum in the cavity or the cavity may be filled with suitable gas, gas mixture or air. The depth d" may be chosen to suit desired wavelength. In an embodiment the depth d" is different from $\lambda/4$ of a target absorption wavelength. In yet another embodiment the depth d" is less than $\lambda/4$ of a target absorption wavelength. In yet another embodiment the depth d" is $\lambda/4$ of a target absorption wavelength.

The absorber structures 159 and 175 absorb radiation illustrated by an arrow 153 and cause electrical changes in the electrodes 161 and 162.

Figure 12:
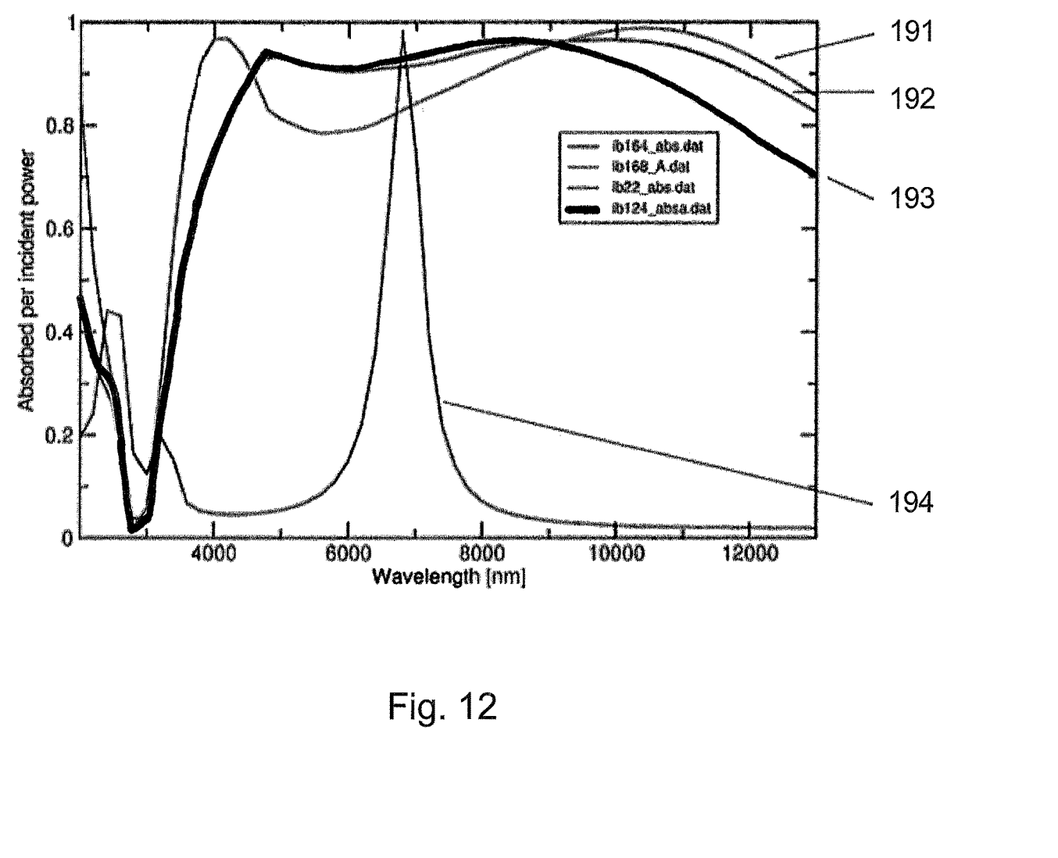
FIG. 12 is a graph showing simulation results for absorbers of some embodiments.

FIG. 12 is a graph showing simulation results for absorbers of some embodiments. High absorption over a broad band can be obtained with several absorber structures such as absorber structures 401, 501, 601, and 701 of FIGS. 4, 5, 6, and 7, while high absorption over a narrow band can also be designed for example with the absorber structures 801 and 901 of FIGS. 8 and 9. Curve 191 shows an example simulation result with the absorber structure 401 of FIG. 4. Curve 192 shows an example simulation result with the absorber structure 601 of FIG. 6. Curve 193 shows an example simulation result with the absorber structure 1003 of FIG. 100. Curve 194 shows an example simulation result with the absorber structure 1001 of FIG. 10A.

Absorber structures of example embodiments provide that the thermal mass of the absorber can be minimized enabling maximization of performance of the thermal detectors. A challenge in developing absorber structures of example embodiments has been finding efficient absorber structures that fulfill the performance requirements of the thermal detectors without increasing the thermal mass of the absorber.

Lower thermal mass of the absorber structure in comparison to conventional absorber structures is achieved in example embodiments due to the fact that the absorber structures of example embodiments are very thin, sparse and no or minimal additional supporting structures are needed (see e.g. FIG. 11). Further, the absorber structures of example embodiments can be used also as the temperature transducing part or as electrical contacts (or as a part of them) of thermal detectors. Conventionally, different materials or layers are needed for different functions (supporting, temperature transducing, absorbing, electrical connections). Absorber structures of example embodiments also enable providing thermal detectors without requiring metal-insulator-metal structures. Instead vacuum, gas, gas mixture or air cavities can be used.

In an embodiment relating to thermoelectric temperature sensing, the absorber structure forms the contacts between thermoelectric legs of a thermal detector. In an embodiment relating to resistive sensing, the absorber structure itself may server as the resistive element with temperature sensitive resistance. These functions are enabled due to a continuous first leg forming the required electrical circuit.

In an embodiment various metamaterial type absorber structures comprise hybrid structures employing both resistive and plasmonic or plasmon mimicking absorber structures. In thermal detectors the absorber structures may be combined with reflecting mirrors and vacuum, gas, gas mixture or air cavities.

The absorber structure of various embodiments may be used in various wavelength bands e.g. in the infrared (IR), terahertz and/or radio frequency (RF) wavelength regions.

Without in any way limiting the scope, interpretation, or application of the claims appearing below, a technical effect the absorber structure of example embodiments is that there is no need to integrate several layers of material in the absorber membrane of a thermal detector to realize different functions. This is enabled by the efficient absorber designs where metamaterial MIM type structures are replaced by an air, gas, gas mixture or vacuum gap and by having continuous first legs in the absorber to serve also as (a part of) the thermal transducer and as a supporting structure. Another technical effect of one or more of the example embodiments disclosed herein is that there are provided novel metamaterial type absorber structures that may employ both resistive, impedance matched, and plasmon mimicking absorber designs, and can be used in thermal detectors together with reflecting mirrors and vacuum, gas, gas mixture or air cavities instead of requiring metal-insulator-metal structures. Such solution allows maintaining high absorption rates.

Another technical effect of one or more of the example embodiments disclosed herein is that high-performance, high-speed, room temperature, IR detectors and imaging arrays may be provided at a reasonable cost. Another technical effect of one or more of the example embodiments disclosed herein is that there are provided mesh like absorber structures that perform as the absorber with minimal supporting structures and that may also serve as the contact between the thermoelectric legs or as (a part of) a resistive thermometer. This enables low thermal mass and heat capacity resulting in high-speed operation in thermal detectors.

Another technical effect of one or more of the example embodiments disclosed herein is that near-perfect absorption together with the low thermal conductivity of the very thin membrane to the heat bath enables high responsivity. Another technical effect of one or more of the example embodiments disclosed herein is that wavelength selective, wideband, uncooled IR sensors with intrinsic control of the detection wavelength, can be realized by use of the absorber structures of various embodiments without need for filters or multilayer structures. Yet another technical effect of one or more of the example embodiments disclosed herein is contribution to development of novel multicolor imaging sensors in addition to highly efficient high-speed broadband IR sensors.

Although various aspects of the disclosed embodiments are set out in the independent claims, other aspects of the disclosed embodiments comprise other combinations of features from the described embodiments and/or the dependent claims with the features of the independent claims, and not solely the combinations explicitly set out in the claims.

It is also noted herein that while the foregoing describes example embodiments of the present disclosure, these descriptions should not be viewed in a limiting sense. Rather, there are several variations and modifications that may be made without departing from the scope of the present disclosure as defined in the appended claims.

The invention claimed is:

1. An absorber structure for a thermal detector, the absorber structure comprising:
edges defining a basic form,
a plurality of first legs of electrically conducting material joined in an electrically conductive manner to form a grid that extends between the edges of the absorber structure, the grid defining openings between the edges, the grid of openings being formed by the plurality of first legs connected together in a continuous loop around the openings, the plurality of first legs forming at least one continuous loop connection between the edges of the absorber structure; and
a plurality of second legs of electrically conducting material joined in an electrically conductive manner to respective ones of the plurality of first legs, wherein respective ones of the plurality of second legs protrude from the respective ones of the plurality of first legs into respective ones of the openings of the grid and terminate at points of termination located at a distance from adjacent ones of the plurality of first legs.

2. The absorber structure of claim 1, wherein said plurality of second legs connect at the points of termination to a second piece of material that has different electrical connectivity characteristics compared to a first material of the plurality of second legs.

3. The absorber structure of claim 2, wherein said second piece of material is one or more of made of a different material from the first material or has a different geometry from a geometry of the plurality of second legs.

4. The absorber structure of claim 3, wherein said different geometry is provided with wire of electrically conducting material having a smaller cross section than a cross section of individual ones of the plurality of second legs.

5. The absorber structure of claim 3, wherein the different material is a dielectric, semiconducting or poorly conducting material.

6. The absorber structure of claim 3, wherein the second piece of material connects a second leg to a first leg or to another second leg.

7. The absorber structure of claim 1, wherein the electrically conducting material of the plurality of first legs and the electrically conducting material of the plurality of second legs comprises one or more of metal, semimetal or highly doped semiconductor material.

8. The absorber structure of claim 1, wherein the electrically conducting material of the plurality of first legs and the electrically conducting material of the plurality of second legs comprises at least one of: titanium Ti, titanium nitride TiN, titanium tungsten TiW, tungsten W, and aluminum doped zinc oxide Al:ZnO.

9. The absorber structure of claim 1, wherein the plurality of second legs form a periodical pattern.

10. The absorber structure of claim 1, wherein the plurality of second legs further comprise a direct, electrically conducting connection to other ones of the plurality of second legs.

11. The thermal detector of claim 1, wherein the absorber structure comprises a single structure mesh defined by the grid extending between the edges of the absorber structure.

12. The thermal detector of claim 1, wherein the openings are closed on all sides by the plurality of first legs and connections between individual ones of the plurality of first legs.

13. The thermal detector of claim 1, wherein the basic form is a square and the plurality of first legs and connections between individual ones of the plurality of first legs define a shape of the openings as a square shape.

14. The thermal detector of claim 1, wherein the plurality of first legs and connections between individual ones of the plurality of first legs define a shape of the openings in the grid as triangular.

15. The thermal detector of claim 1, wherein the plurality of first legs and connections between individual ones of the plurality of first legs define a shape of the openings in the grid as one of hexagonal or octagonal.

16. A thermal detector comprising an absorber structure, wherein the absorber structure comprises:
edges defining a basic form,
a plurality of first legs of electrically conducting material joined in an electrically conductive manner to form a grid that extends between the edges of the absorber structure, the grid defining openings between the edges, the grid of openings being formed by the plurality of first legs connected together in a continuous loop around the openings, the plurality of first legs forming at least one continuous loop connection between the edges of the absorber structure; and
a plurality of second legs of electrically conducting material joined in an electrically conductive manner to respective ones of the plurality of first legs, wherein respective ones of the plurality of second legs protrude from respective ones of the plurality of first legs into respective ones of the openings of the grid and terminate at points of termination located at a distance from adjacent ones of the plurality of first legs.

17. The thermal detector of claim 16, wherein the thermal detector comprises thermoelectric legs and the absorber structure forms contacts between the thermoelectric legs.

18. The thermal detector of claim 16, wherein the thermal detector comprises a reflective element in a stacked configuration with the absorber structure and a cavity formed between the absorber structure and the reflective element.

19. The thermal detector of claim 18, wherein a depth of the cavity formed between the absorber structure and the reflective element is different from $\lambda/4$ of a target absorption wavelength.

20. The thermal detector of claim 16, wherein the absorber structure serves as a support structure of the thermal detector.

* * * * *